(12) United States Patent
Ahmann

(10) Patent No.: US 10,938,931 B1
(45) Date of Patent: Mar. 2, 2021

(54) CENTRAL SUBSCRIPTION PLATFORM

(71) Applicant: Christian Nicolas Ahmann, Zurich (CH)

(72) Inventor: Christian Nicolas Ahmann, Zurich (CH)

(*) Notice: Subject to any disclaimer, the term of this patent is extended or adjusted under 35 U.S.C. 154(b) by 0 days.

(21) Appl. No.: 16/731,589

(22) Filed: Dec. 31, 2019

(51) Int. Cl.
G06F 15/16 (2006.01)
H04L 29/08 (2006.01)
H04L 12/58 (2006.01)

(52) U.S. Cl.
CPC .............. *H04L 67/26* (2013.01); *H04L 51/18* (2013.01); *H04L 67/18* (2013.01)

(58) Field of Classification Search
CPC .......... H04L 67/26; H04L 67/18; H04L 51/18
See application file for complete search history.

(56) References Cited

U.S. PATENT DOCUMENTS

| 6,167,435 A * | 12/2000 | Druckenmiller .... G06F 16/9535 709/206 |
| 2004/0203611 A1* | 10/2004 | Laporta ................... H04W 4/12 455/412.1 |
| 2007/0213079 A1* | 9/2007 | Dubin ................... G06Q 20/20 455/466 |
| 2008/0281917 A1* | 11/2008 | Wolf ................. H04N 7/17318 709/205 |
| 2012/0051219 A1* | 3/2012 | Hart ...................... H04L 43/026 370/235 |
| 2013/0254036 A1* | 9/2013 | Trinh ................. G06Q 30/0269 705/14.64 |
| 2013/0268468 A1* | 10/2013 | Vijayaraghavan ..... G06N 20/00 706/12 |
| 2015/0113549 A1* | 4/2015 | Wolf .................... H04N 21/251 725/9 |
| 2015/0256499 A1* | 9/2015 | Kumar ................... H04L 67/22 709/206 |
| 2020/0013085 A1* | 1/2020 | Kang ................. G06Q 30/0255 |
| 2020/0193063 A1* | 6/2020 | Barday ............... G06F 21/6263 |
| 2020/0210558 A1* | 7/2020 | Barday ................. G06F 21/316 |

* cited by examiner

*Primary Examiner* — Jonathan A Bui

(74) *Attorney, Agent, or Firm* — Middleton Reutlinger; Eric S. Barr

(57) ABSTRACT

Methods and systems for managing subscription processes, and setting subscribers to active and thereby sending subscribers future content, are disclosed. A method includes: receiving a first email address of a first subscriber and a second email address of a second subscriber; classifying the first subscriber into a first group based on a location of the first subscriber and the second subscriber into a second group based on a location of the second subscriber; sending a confirmation email including a confirmation button or link to the first email address of the first subscriber in the first group; and sending a content email to the second email address of the second subscriber in the second group, and avoiding sending the content email to the first email address of the first subscriber in the first group until receiving an indication that the first subscriber has selected the confirmation button or link.

19 Claims, 8 Drawing Sheets

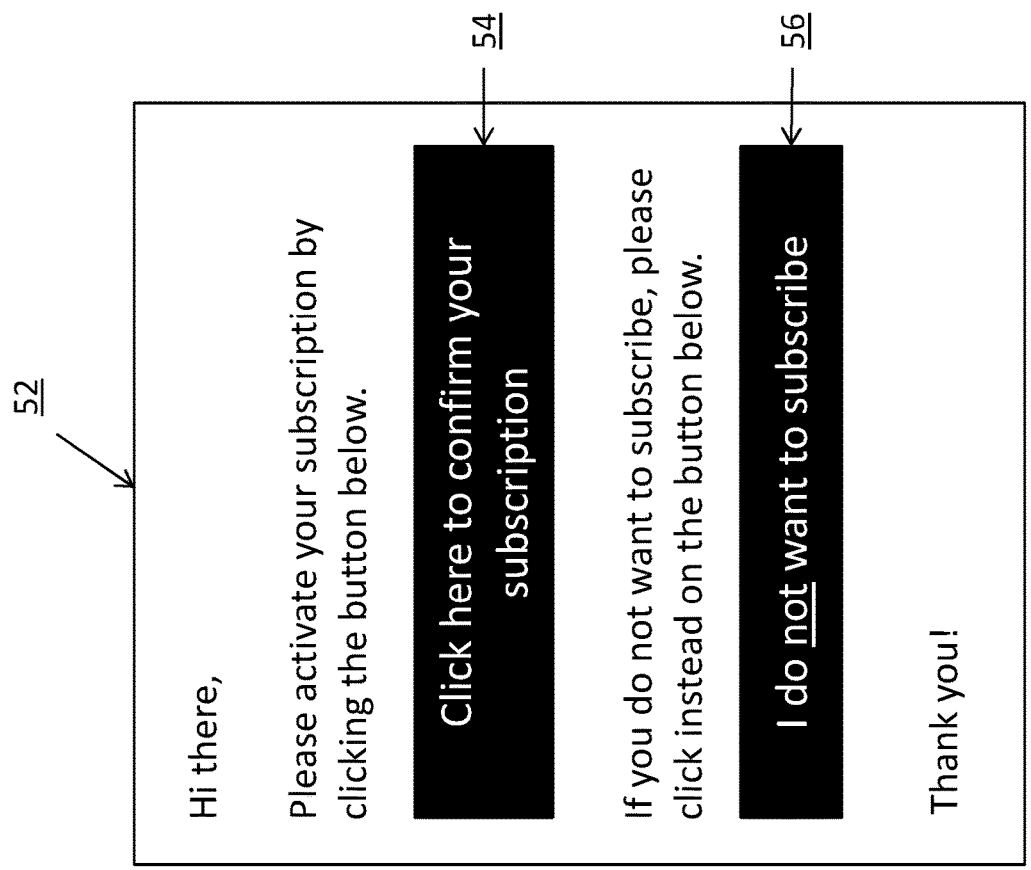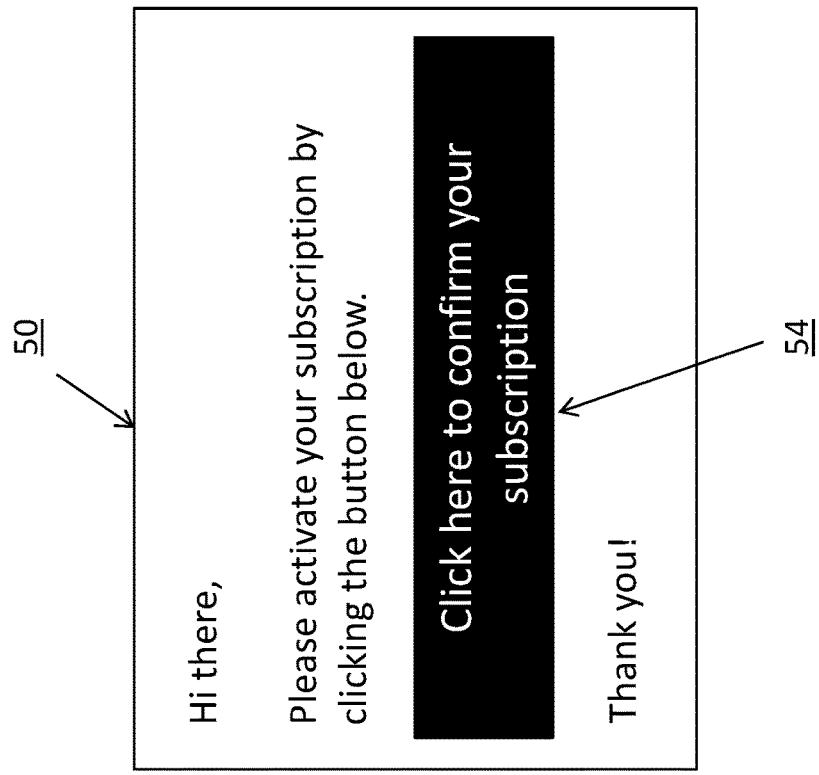
FIGURE 5

CENTRAL SUBSCRIPTION PLATFORM

BACKGROUND

Aspects of the present invention generally relate to content publication and distribution, and, more particularly, to methods and systems for optimizing subscription and confirmation processes for new subscribers which maximize a number of active subscribers for publishers while reducing associated risks and drawbacks.

The rise of the internet and the development of publication tools has made it very convenient for publishers to set up websites and provide content to the public in a quick and cost-effective manner. However, most websites are only economically successful if they manage to attract a significant number of readers ("website traffic"), as this determines the value of the website which can be monetized in various ways, e.g. by placing advertising on the website. Website traffic is the result of both new visitors coming to the website, as well as returning readers. As an important tool to build up the number of returning readers, publishers may choose to offer an option for visitors to subscribe to their website so that subscribers receive alerts when new content has been published, so that those subscribers come back to the website and increase the website traffic accordingly. One of the most common tools to allow visitors to get updated is the email newsletter, for which publishers place a subscription form, or a link to a subscription page, on their websites, enabling visitors to subscribe by entering their email address.

SUMMARY

In a first aspect of the invention, there is a method that includes: receiving, by a computing device, a first email address of a first subscriber and a second email address of a second subscriber; classifying, by the computing device, the first subscriber into a first group based on a location of the first subscriber and the second subscriber into a second group based on a location of the second subscriber; sending, by the computing device, a confirmation email including a confirmation button or link to the first email address of the first subscriber in the first group; and sending, by the computing device, a content email to the second email address of the second subscriber in the second group, and avoiding sending the content email to the first email address of the first subscriber in the first group until receiving an indication that the first subscriber has selected the confirmation button or link.

In another aspect of the invention, there is a method that includes: receiving, by a computing device, email addresses of at least two subscribers; classifying, by the computing device, a first of the at least two subscribers into a single opt-in group based on a risk check, and classifying the second of the at least two subscribers into a double opt-in group based on the risk check; sending, by the computing device, a confirmation email containing a confirmation button or link to at least the second subscriber who has been classified as a member of the double-opt in group; and sending, by the computing device, a content email to the first subscriber in the single opt-in group while avoiding sending the content email to the second subscriber in the double opt-in group until receiving an indication that the second subscriber has selected the confirmation button or link in the confirmation email.

In another aspect of the invention, there is a computer program product that includes a non-transitory computer readable storage medium having program instructions embodied therewith. The program instructions are executable by a computing device to cause the computing device to: receive a first email address of a first subscriber and a second email address of a second subscriber; determine a location of the first subscriber and a location of the second subscriber; classify the first subscriber into a first group based on the location of the first subscriber and the second subscriber into a second group based on the location of the second subscriber; send a confirmation email including a confirmation button or link to the first email address of the first subscriber in the first group; and send a content email to the second email address of the second subscriber in the second group, and avoid sending the content email to the first email address of the first subscriber in the first group until receiving an indication that the first subscriber has selected the confirmation button or link.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 depicts examples of two confirmation emails which may be sent by the central subscription platform to enable subscribers to confirm their subscription, in accordance with an embodiment of the invention;

DETAILED DESCRIPTION

Figure 1:
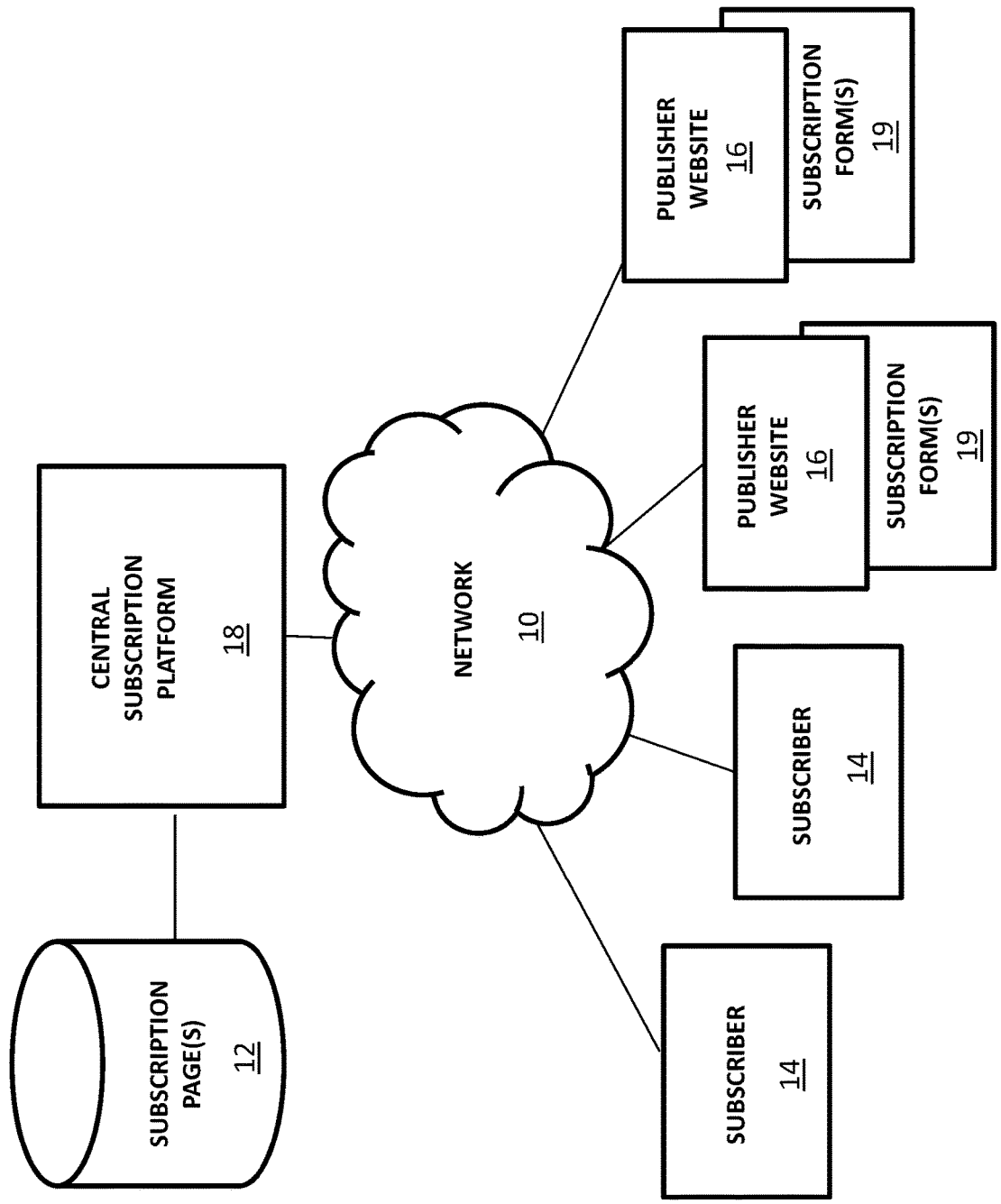
FIG. 1 depicts an illustrative environment including a central subscription platform in accordance with an embodiment of the invention.

Aspects of the present invention generally relate to content publication and distribution, and, more particularly, to methods and systems for optimizing subscription and confirmation processes for new subscribers which maximize a number of active subscribers for publishers while reducing associated risks and drawbacks. As described herein, aspects of the invention include a method and system for managing subscription processes, and setting subscribers to active and thereby sending subscribers future content. In embodiments, a central subscription platform performs a number of checks per subscriber in order to determine which confirmation process shall be applied to each subscriber for setting them to active, therefore applying different confirmation processes to subscribers of the same subscription list.

As described herein, aspects of the invention include a method (and corresponding system and computer program product) for allowing users to subscribe in order to receive a publisher's updates and new content in the future. As described herein, in embodiments, the subscription is enabled through a central subscription platform in conjunction with the publisher's website, for example by the publisher embedding a form on a website, or linking to a subscription page hosted on the servers of the central subscription platform.

As the number of subscribers may directly correlate with future traffic, publishers may attempt to maximize the number of subscribers. Aspects of the present invention may help publishers to achieve this, as well as solve other problems in a unique and novel manner. Aspects of the invention provide subscription processes which set a subscriber to active after they have provided their email addresses, thereby sending content emails to subscribers going forward. According to aspects of the invention, one such process is a single opt-in process whereby no additional confirmations are required and subscribers are immediately active after they have submitted their email via the subscription form. According to aspects of the invention, another process is a double opt-in process whereby a confirmation email is sent to the subscriber, containing a confirmation button or link. In embodiments, in the double opt-in process, the subscription is not activated until the subscriber clicks on or otherwise selects the confirmation link, and only after the subscriber clicks on or otherwise selects the confirmation link will future content emails will be sent to the subscriber. However, applying the same opt-in process to all subscribers of the same subscription list may have drawbacks. For example, the single opt-in process may not be compliant with the regulations of some countries from where the subscribers are subscribing from, as not all countries consider the provision of an email address on a publisher's website sufficient consent from the subscriber to receive future content emails. Therefore, if the publisher applied a single opt-in process to all the subscribers of the subscription list, the publisher would not adhere to the law from some countries. On the other hand, applying a double opt-in subscription process to all subscribers, which would be compliant with the law of all countries, also has drawbacks, especially due to the fact that requiring an additional step for subscribers to confirm their subscription may lead to a lower number of active subscribers, which is not in the interest of the publisher. In order to address these problems, embodiments of the present invention provide advanced methodologies to determine in which cases a double opt-in or single opt-in process shall be applied, allowing the application of different opt-in processes to subscribers of the same subscription list.

The figures and the following description relate to embodiments by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. It should be noted that from the following discussion, alternate embodiments of the structures and methods disclosed herein will be readily recognized by one skilled in the art as viable alternatives that may be employed without departing from the principles described herein.

Referring now to FIG. 1, a central subscription platform 18 regulates the subscription processes and the sending of information through a network 10 to subscribers 14. Visitors of a publisher website 16 become subscribers 14 by entering their contact information, such as their email address, in a subscription form 19, placed on the publisher's website 16. In another embodiment of the invention, visitors of a publisher website 16 become subscribers 14 by the publisher website 16 linking to a subscription page 12 where visitors can subscribe. The central subscription platform 18 may then apply confirmation processes to determine if the subscribers 14 become active subscribers, receiving future content, or not, as outlined further below.

Figure 2:
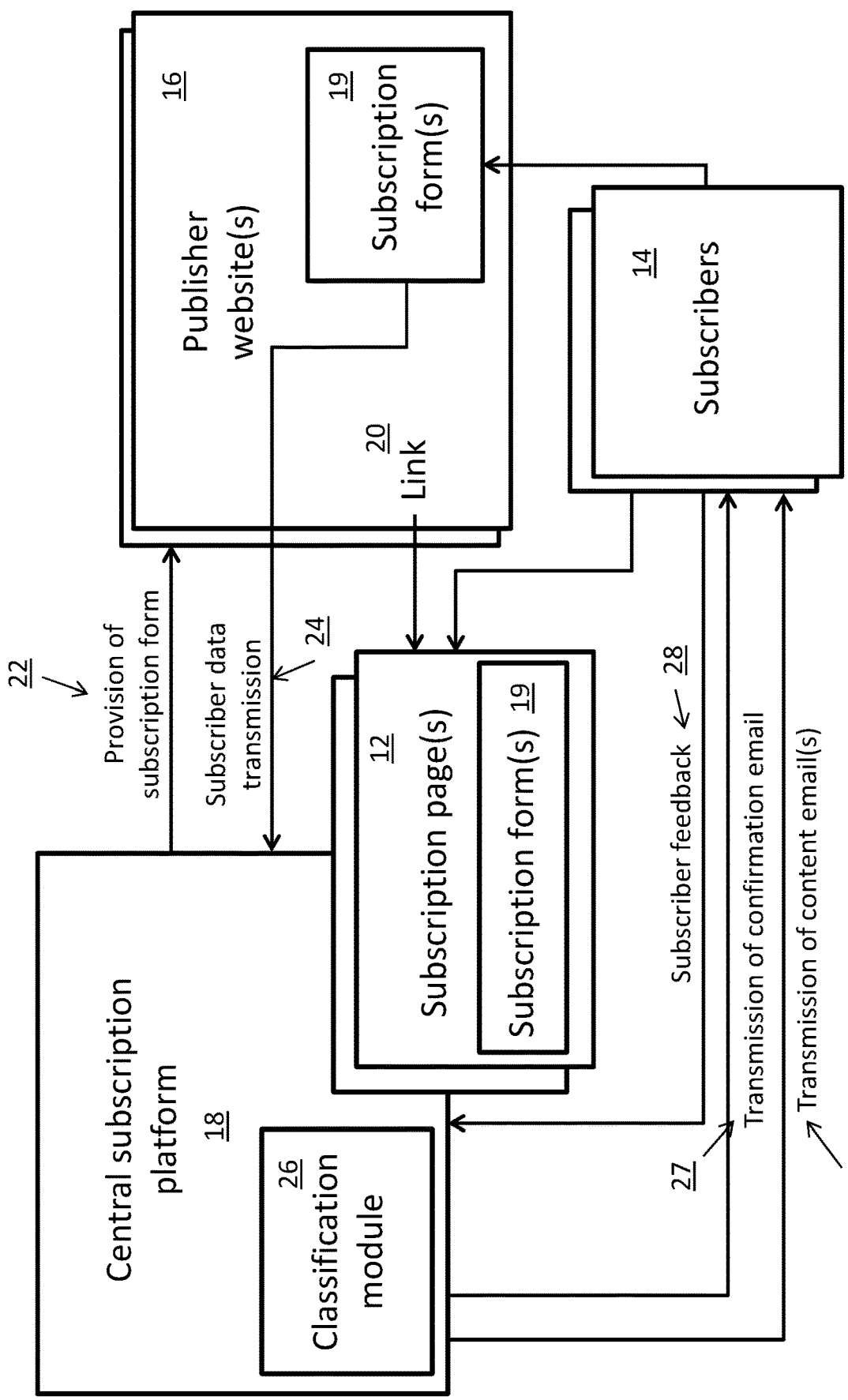
FIG. 2 is a system block diagram illustrating how a publisher's website offers visitors an option to subscribe, either via subscription form or a link pointing to a subscription page, and a process for subscribers to confirm their subscription and receive future content emails, in accordance with an embodiment of the invention.

Referring now to FIG. 2, there is shown a system block diagram illustrating one process for subscribing subscribers 14 and receive information from a publisher in the future. The publisher may embed a subscription form 19, which may be provided 22 by the central subscription platform 18, on the publishers website 16 so that subscribers 14 can submit their contact information, such as their email, on the subscription form 19 which then gets transmitted 24 to the central subscription platform 18. The transmission 24 may also include other information about the subscriber such as the subscriber's Internet Protocol (IP) address, location, operating system, or browser information. For determining the location of the subscriber 14 information such as the subscribers IP address, wireless network connection, cell tower information, or Global Positioning System (GPS) information may be used. In an alternative embodiment of the invention, visitors of a publisher website 16 become subscribers by the publisher website 16 having placed a link 20 to a subscription page 12 which may also contain a subscription form 19 where visitors can subscribe. Upon receiving the email address from the subscriber 14 via the subscription form 19, the central subscription platform 18 performs several checks as part of a classification module 26 in order to classify the subscriber as a single opt-in or double opt-in subscriber (as described further below). Depending on the outcome of the classification in the classification module 26 the central subscription platform 18 may subsequently send 27 a confirmation email 50 or 52 to the subscriber 14 containing a confirmation link 54 (shown in FIG. 5). In embodiments, a purpose of the confirmation email 50 or 52 is to determine consent from subscribers 14 to receive content emails in the future, and is separate from content emails which contain the content published by the publisher, which the subscribers 14 subscribe to. The subscriber's response to the confirmation email 50 or 52, for example by clicking on or otherwise selecting the confirmation link 54 or omitting clicking on or otherwise selecting the confirmation link 54, can be used by the central subscription platform 18 as feedback 28 from the subscriber 14 in order to determine if the subscriber 14 should be set to active, thereby sending content emails by the publisher in the future 29, sent via the central subscription platform 18.

Figure 3:
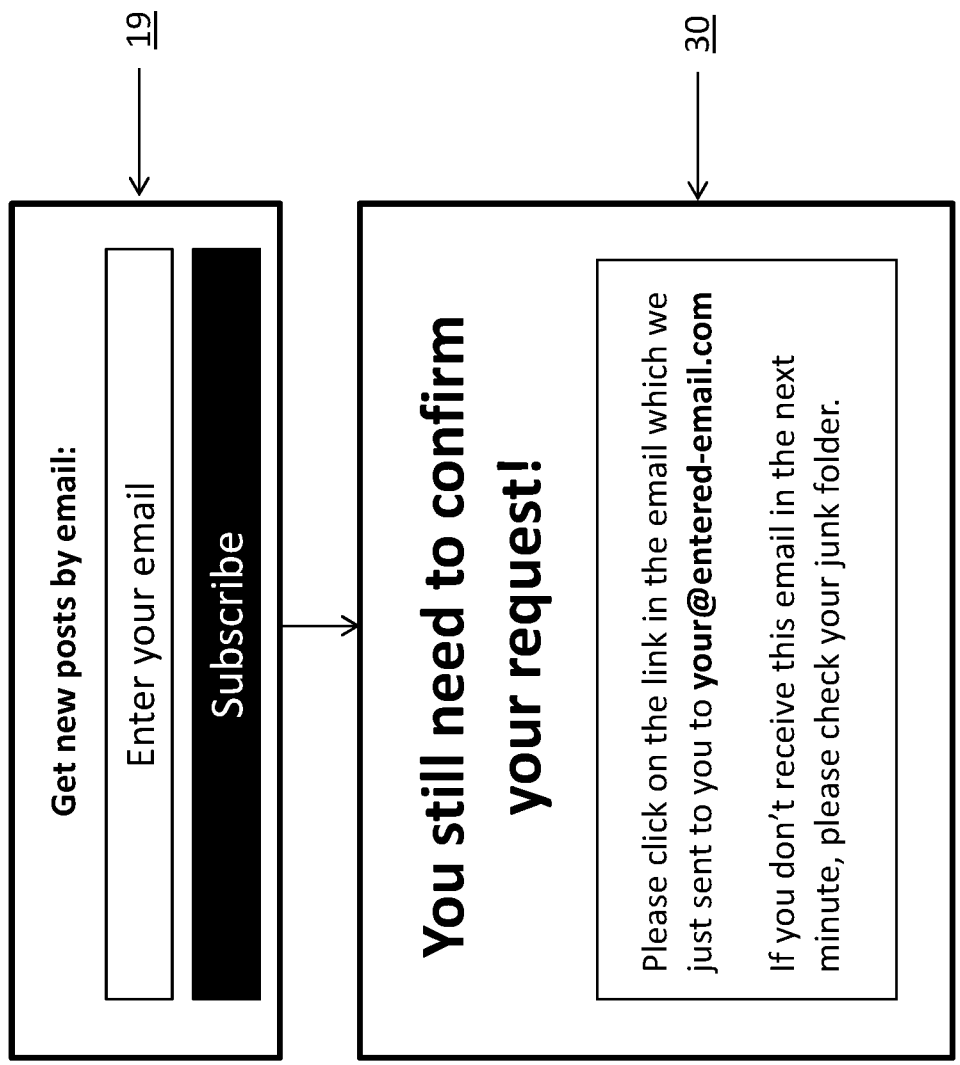
FIG. 3 depicts an example of a subscription form and a confirmation request page which is displayed to a subscriber after the subscriber submits their email via the subscription form, in accordance with an embodiment of the invention.

Turning now to FIG. 3, an example of a subscription form 19 is displayed which may reside on (e.g., be provided to a visitor from) the publisher's website 16 (shown in FIG. 2). Upon submission of the subscribers' information, such as an email address, the subscribers 14 may be shown a screen 30 on the publisher's website 16 prompting them to confirm their subscription by clicking on or otherwise selecting a confirmation link 54 sent via email.

Figure 4:
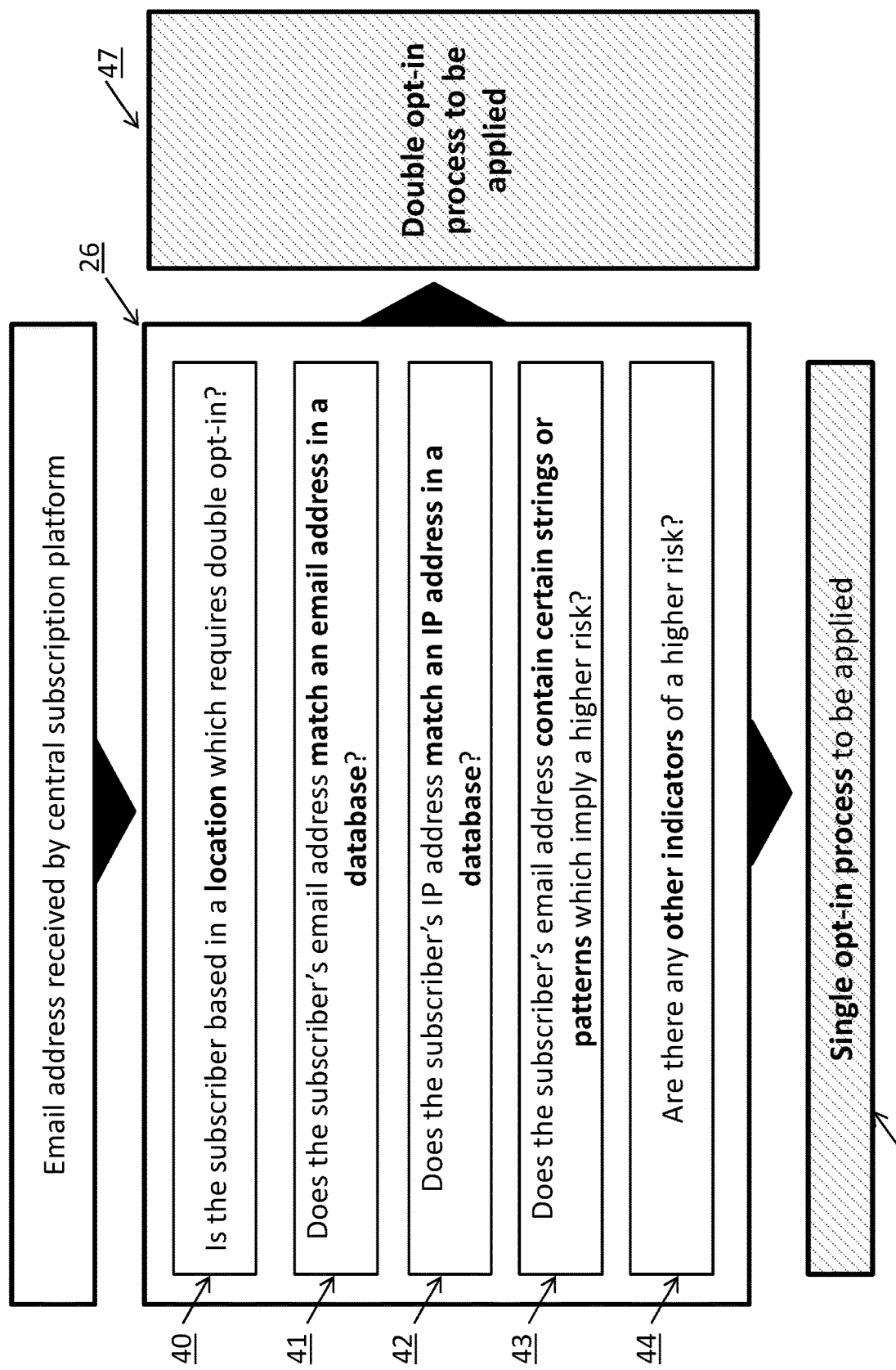
FIG. 4 is a decision tree illustrating an example of how the central subscription platform classifies subscribers to either apply a double opt-in or a single opt-in process, in accordance with an embodiment of the invention.

Referring now to FIG. 4, there is shown example for a methodology how the central subscription platform 18 may classify subscribers to either apply a double opt-in 47 or a single opt-in 48 process, as part of the classification module 26. In case of a double opt-in process 47, a subscriber 14 is inactive by default, and only set to active in response to the subscriber 14 clicking on or otherwise selecting the confirmation link 54 in the confirmation email sent to the subscriber 14. A subscriber 14 needs to be set to active in order to receive content emails in the future. In case of a single opt-in process 48 the subscriber 14 is set to active immediately after subscribing. A subscriber 14 classified as single opt-in may still see a prompt 30 to confirm his subscription, receive the confirmation email, and have the option to confirm by clicking on or otherwise selecting a confirmation link 54. Even though a confirmation is not required by a subscriber 14 classified as single opt-in to receive content emails in the future, a publisher may still prefer to receive a final confirmation from the subscriber 14, as this provides a higher level of certainty and documentation that it was the intention of the subscriber 14 to receive content emails in the future.

Referring again to FIG. 4, the classification module 26, in order to determine whether to apply a single 48 or double opt-in 47 process, may contain a check 40 in which a location, such as a specific country, the subscriber is based in, is determined for example via the IP address of the subscriber 14 which was transmitted 24 to the central subscription platform 18 at time of subscription. In case the subscriber 14 is based in a country which requires the application of a double-opt in process 47 by law, a double opt-in process 47 may be applied. The decision tree may also include a series of risk checks, such as a check 41 if the email address of the subscriber 14 is contained in a database, and if so, apply a double opt-in process 47. The email database may contain a list of email addresses which have been used previously on the central subscription platform 18, or it may be a list of email addresses which are publicly available and therefore can be considered as high-risk emails for which it is safer to apply a double opt-in process 47 to ensure a high quality list of active subscribers 14. The database may also rest on third party servers, which have given email addresses risk scores, which the central subscription platform 18 queries, in order to determine if an email address is considered risky, and therefore apply a double opt-in process 47. The classification module 26 may also perform a check 42 if the IP address of the subscriber 14 is contained in a database, and if so, apply a double opt-in process 47. The IP database may contain a list of IP addresses which have been used by other subscribers 14 on the central subscription platform 18 previously, or it may be a list of IP addresses which are publicly known to be associated with a higher risk, in which cases it is safer to safer to apply a double opt-in process 47 to ensure a high quality list of active subscribers 14. The IP database may also rest on third party servers, which have given IP risk scores, which the central subscription platform 18 queries, in order to determine if the email address submitted from that IP address can be considered risky, and therefore apply a double opt-in process 47. The classification module 26 may also perform a check 43 for certain patterns, strings or characters in the submitted email address which could imply a higher risk, and therefore apply a double opt-in process 47. For example, an email address may include a series of numbers which could imply a higher risk as those email addresses are frequently used by spammers. Furthermore, the classification module 26 may also perform various other checks 44, for example a check which analyzes other information transmitted 24 to the central subscription platform 18 at time of subscription, such as the digital fingerprint of a subscriber 14 (operating system, browser version etc.), for example to determine if another user subscribed from the same computer previously, in which case a double opt-in process 47 may be applied. If all of the above checks 40, 41, 42, 43, 44 are negative, a single opt-in process 48 may be applied. In embodiments, the classification module 26 may perform one, several, or all of above mentioned checks 40, 41, 42, 43, 44 in order to determine if a single 48 or double opt-in process 47 may be applied.

Turning now to FIG. 5, examples of two confirmation emails 50 and 52 are illustrated. In embodiments, one of the confirmation emails 50, 52 is sent to the subscribers 14 who were selected to go through a double opt-in process 47 as those subscribers 14 are inactive by default, and are not activated until the subscribers 14 click on or otherwise select a confirmation button or link 54. In the double opt-in process 47, in response to the subscribers 14 clicking on or otherwise selecting the confirmation button or link 54 in the email 50, 52, the central subscription platform 18 sets those subscribers 14 to active, and sends content emails going forward 29. In embodiments, for subscribers 14 who were selected to go through a single opt-in process 48, one of the confirmation emails 50, 52 may be sent to the subscribers 14. However, a click on a confirmation button or link 54 is not required in order for the central subscription platform 18 to send content emails going forward 29, as those subscribers 14 are already active by default. However, it may still be useful for the central subscription platform 18 to send a confirmation email 50, 52 to subscribers 14 to whom a single opt-in process 48 was applied, as this allows the central subscription platform 18 to collect additional confirmation that the subscribers 14 wish to receive content emails going forward, which may be used by the central subscription platform 18, for example, in the event that a subscriber 14 claims to never have agreed to receive content emails.

In embodiments, the confirmation email 50 may only contain a button or link 54 for the subscribers 14 to click on or otherwise select in order to confirm the subscription, thereby confirming their intention to receive content emails in the future. In embodiments, while the confirmation email 50 can be used for both subscribers 14 to whom a single opt-in 48 or double opt-in process 47 was applied, it may especially be used for subscribers 14 classified as double opt-in, as in the event the subscribers 14 change their minds and do not want to receive future content emails, they omit clicking on or otherwise selecting the confirmation button or link 54, therefore stay inactive, and hence do not receive content emails going forward. However, if a subscriber 14 is selected to go through a single opt-in process 48, and still receives a confirmation email 50, then the omission of clicking on the confirmation button or link 54 will not stop content emails from being sent in the future 29, as subscribers 14 classified as single opt-in are active by default. Therefore, in order to avoid confusion among subscribers 14 who went through a single opt-in process 48, in embodiments, an enhanced confirmation email 52 may be used which also contains a button or link 56 to give subscribers 14 the opportunity to explicitly express a preference to not receive content emails going forward. In response to subscribers 14 classified as single opt-in clicking on or otherwise selecting button or link 56, the subscribers are set to inactive by the central subscription platform 18, and therefore no content emails will be sent to those subscribers going forward. In embodiments, while the confirmation email 52 which contains a button or link 56 allowing subscribers 14 to express a preference to not receive content emails going forward may especially be useful for subscribers 14 to whom a single opt-in process 48 was applied, it may still be used to subscribers 14 to whom a double opt-in process 47 was applied.

Figure 6:
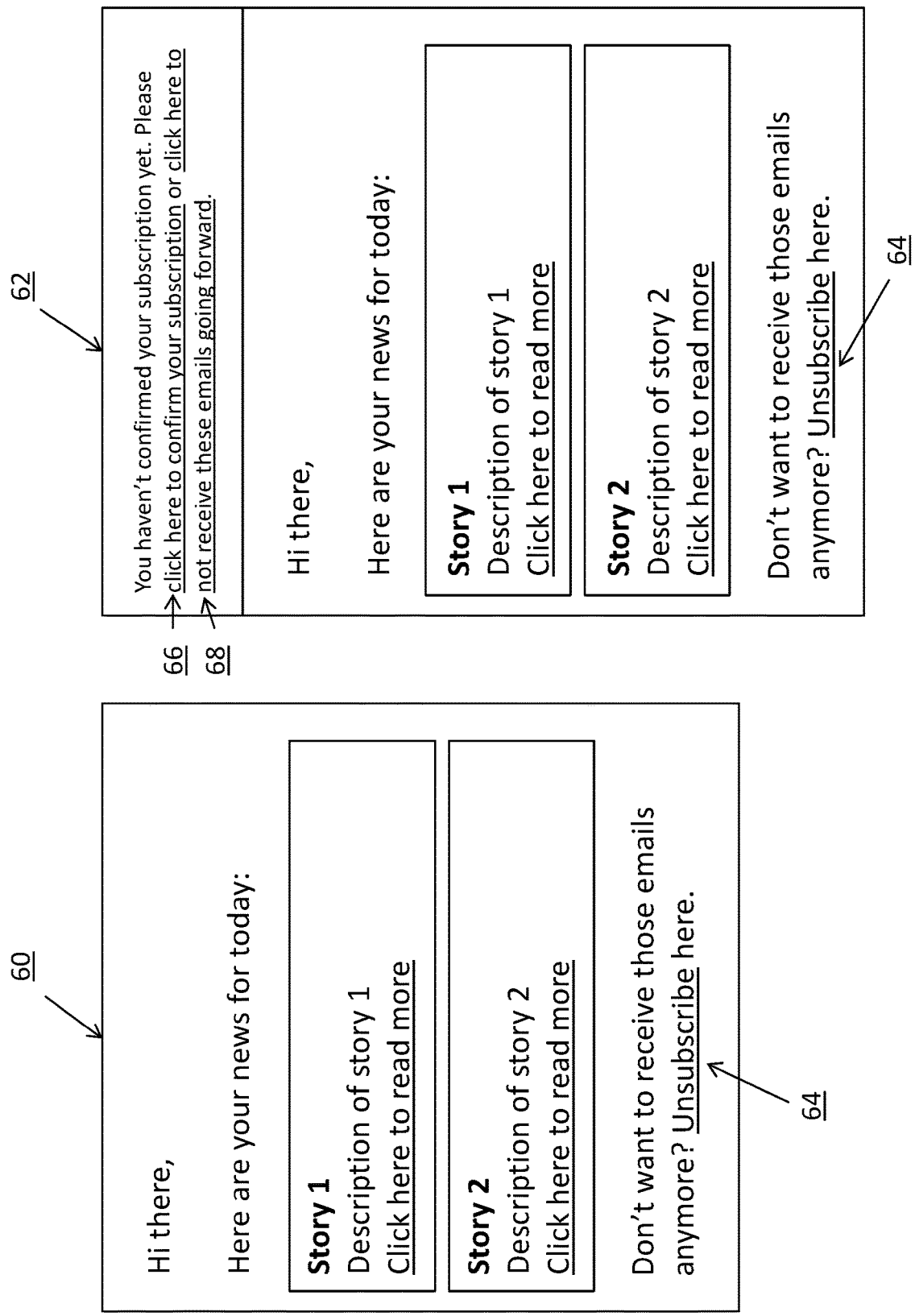
FIG. 6 depicts examples of two content emails which are sent to active subscribers after a publisher has published new information, in accordance with an embodiment of the invention.

Moving now to FIG. 6, examples of two content emails 60 and 62 are illustrated, which are sent 29 by the central subscription platform 18 to subscribers 14 in response to the publisher publishing new content (e.g., on the publisher website 16). In embodiments, only those subscribers 14 who are active in the system of the central subscription platform 18 receive the content emails 60, 62. In embodiments, the content emails 60, 62 may include an unsubscribe button or link 64 which allows active subscribers 14 to opt-out of receiving content emails 60, 62 in the future. The content email 62 may also include an additional button or link 66 to confirm the subscription, and an additional button or link 68 for the subscriber 14 to express that future content emails are not wished to be received. The additional links 66 and 68 may be included in cases where the central subscription platform 18 classified a subscriber 14 as to go through a single opt-in process 48, where the subscriber has not explicitly expressed yet if content emails are desired to be received or not. In embodiments, if the subscriber 14 clicks on or otherwise selects the confirmation link 66 in the content email then future content emails may not contain the confirmation link 66 or decline link 68.

Figure 7:
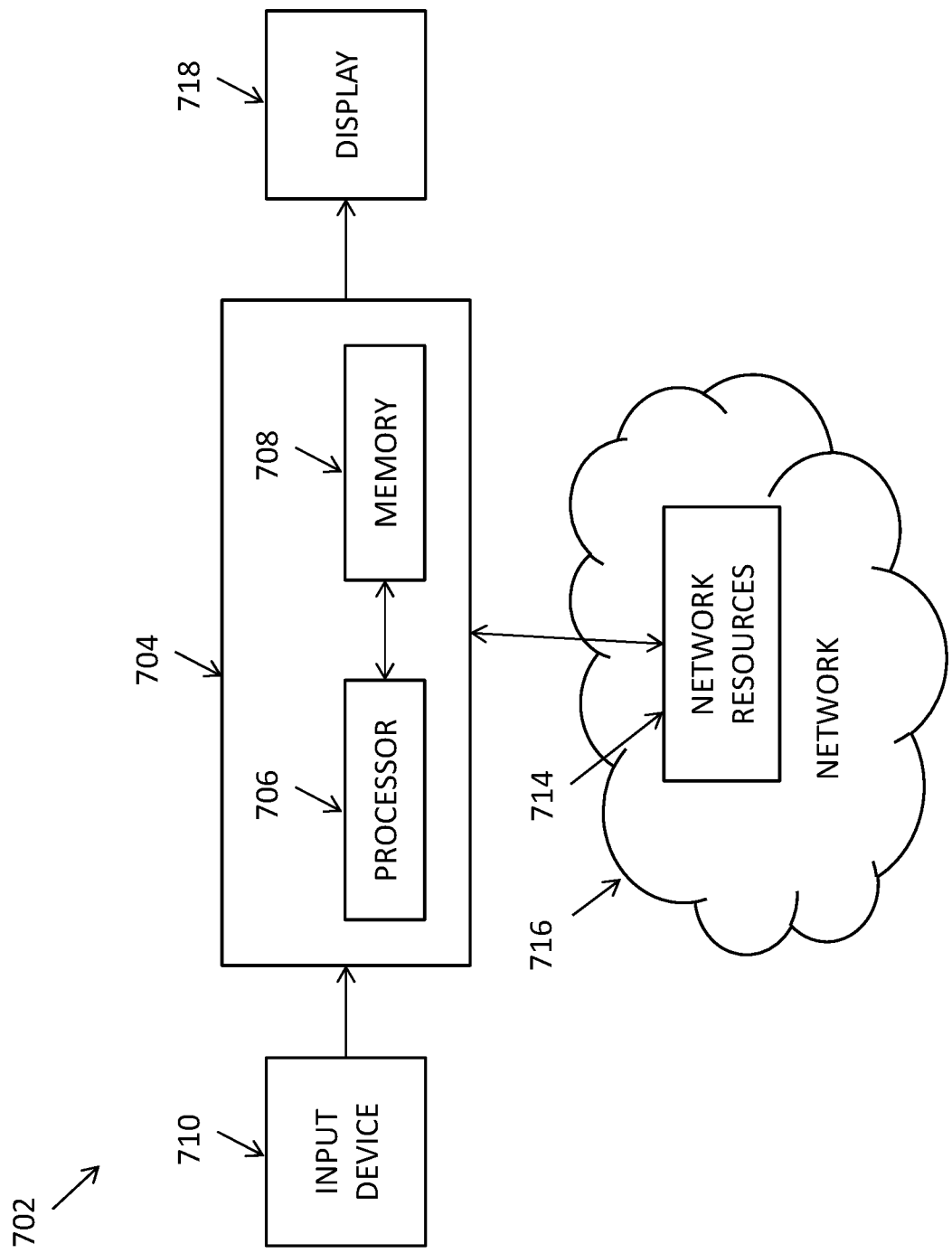
FIG. 7 is a block diagram illustrating a computer system upon which the subscription and content sending processes may be implemented, in accordance with an embodiment of the invention.

FIG. 7 is a block diagram illustrating a computer system 702 upon which the invention may be implemented, according to an embodiment. The system 702 includes a computer/server platform 704 on which the central subscription platform 18 resides, which includes a processor 706 and memory 708 which operate to execute instructions, as known to one of skill in the art. The term "computer-readable storage medium" as used herein refers to any tangible medium, such as a disk or semiconductor memory, that participates in providing instructions to processor 706 for execution. Additionally, the computer platform 704 receives input from a plurality of input devices 710, such as a keyboard, mouse, touch device, touchscreen, or microphone. An example for such an input can be information about the publishers website 16, such as a Uniform Resource Locator (URL), in order for the central subscription platform 18 to generate a subscription form 19 to be placed on the publishers websites 16.

The computer platform 704 may further be connected to network resources 714 which connect to the Internet or other components of a local public or private network. The network resources 714 may provide instructions and data to the computer platform 704 from a remote location on a network 716, such as contact information from subscribers 14 which was submitted on a publishers website 16 which gets transmitted to the central subscription platform 18. The connections to the network resources 714 may be via wireless protocols, such as the 802.11 standards, Bluetooth® or cellular protocols, or via physical transmission media, such as cables or fiber optics. The network resources may include storage devices for storing data and executable instructions at a location separate from the computer platform 704. The computer platform 704 interacts with a display 718 to output data and other information to a user, such as subscribers 14 or administrators of a publisher website 16, as well as to request additional instructions and input from the user. The display 718 may be a touchscreen display and may act as an input device 710 for interacting with a user.

Figure 8:
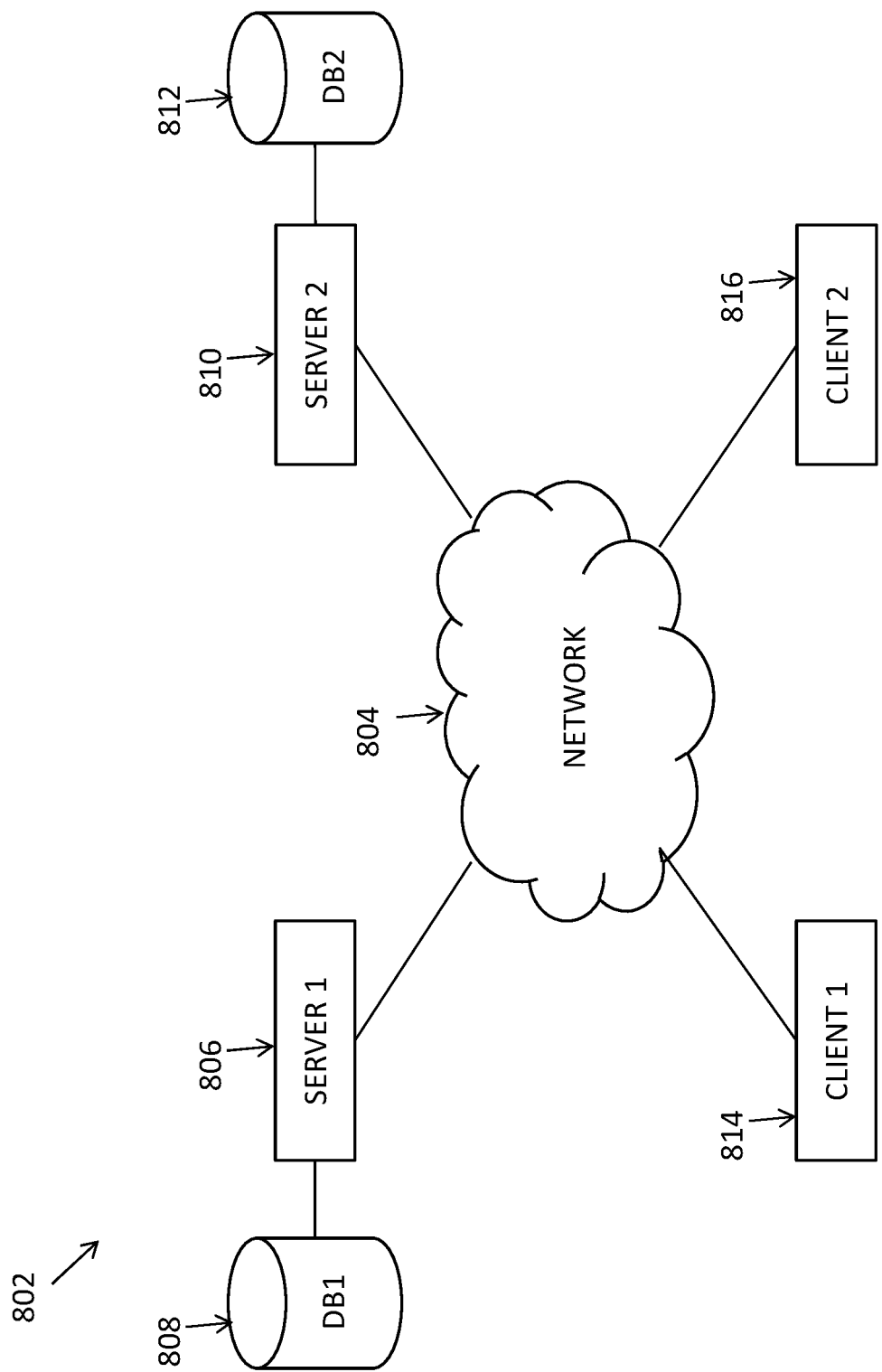
FIG. 8 is a block diagram illustrating a network including servers upon which the system may be implemented, in accordance with an embodiment of the invention.

FIG. 8 is a block diagram that illustrates an embodiment of a network 802 including servers 806, 810 upon which the system may be implemented and client machines 814, 816, which can be those of subscribers 14, that communicate with the servers 806, 810. The client machines 814, 816 communicate across the Internet or another wide area network (WAN) or local area network (LAN) 804 with server 1 806 and server 2 810. Server 1 806 communicates with database 1 808, and server 2 810 communicates with database 2 812. According to an embodiment, one or both of server 1 806 and server 2 810 may implement the subscription processes system. Client 1 814 and/or client 2 816 may interface with the system and request server 1 806 and/or server 2 810 to perform processing. Server 1 806 may communicate with or otherwise receive information from database 1 808 or another internal or external data source or database, and server 2 810 may communicate with database 2 812 or another internal or external data source or database.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

It is contemplated for embodiments to extend to individual elements and concepts described herein, independently of other concepts, ideas or system, as well as for embodiments to include combinations of elements recited anywhere in this application. Although illustrative embodiments have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. This, the absence of describing combinations should not preclude the inventor from claiming rights to such combinations.

In general, the routines executed to implement the embodiments, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects. Moreover, while the invention has been described in the context of fully functioning computers and computer systems, those skilled in the art will appreciate that the various embodiments are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), and flash drives, among others.

Although the present invention has been described with reference to specific exemplary embodiments, it will be evident that the various modification and changes can be made to these embodiments without departing from the broader spirit of the invention.

What is claimed is:

1. A method comprising:
receiving, by a computing device, a first email address of a first subscriber and a second email address of a second subscriber;
classifying, by the computing device, the first subscriber into a first group based on a location of the first subscriber and the second subscriber into a second group based on a location of the second subscriber;
sending, by the computing device, a confirmation email including a confirmation button or link to the first email address of the first subscriber in the first group; and
sending, by the computing device, a content email to the second email address of the second subscriber in the second group, and avoiding sending the content email to the first email address of the first subscriber in the first group until receiving an indication that the first subscriber has selected the confirmation button or link,
wherein the first group is a double opt-in group and the second group is a single opt-in group.

2. The method according to claim 1, wherein the location of the first subscriber is determined based on an Internet Protocol (IP) address of the first subscriber and the location of the second subscriber is determined based on an IP address of the second subscriber.

3. The method according to claim 1, wherein the location of the first subscriber and the location of the second subscriber are determined using a Global Positioning System or a wireless network connection.

4. The method according to claim 1, further comprising sending, by the computing device, the confirmation email to the second email address of the second subscriber in the second group.

5. The method according to claim 4, wherein the confirmation email sent to the email address of the second subscriber in the second group further includes a button or link to decline an email subscription, and in response to receiving an indication that the second subscriber has selected the decline button or link, avoiding sending the content email to the second email address of the second subscriber in the second group.

6. The method according to claim 1, wherein the content email sent to the second email address of the second subscriber in the second group includes a confirmation button or link, and in response to receiving an indication that the second subscriber has selected the confirmation button or link, removing the confirmation button or link from a subsequent content email sent to the second email address of the second subscriber in the second group.

7. The method according to claim 1, wherein the first subscriber and the second subscriber are subscribers of a same subscription list.

8. A method comprising:
receiving, by a computing device, email addresses of at least two subscribers;
classifying, by the computing device, a first of the at least two subscribers into a single opt-in group based on a risk check, and classifying the second of the at least two subscribers into a double opt-in group based on the risk check;
sending, by the computing device, a confirmation email containing a confirmation button or link to at least the second subscriber who has been classified as a member of the double-opt in group; and
sending, by the computing device, a content email to the first subscriber in the single opt-in group while avoiding sending the content email to the second subscriber in the double opt-in group until receiving an indication that the second subscriber has selected the confirmation button or link in the confirmation email.

9. The method according to claim 8, wherein the risk check includes determining whether or not the email addresses are present in an email address database, and
further comprising classifying the second of the at least two subscribers into the double opt-in group based on the email address of the second of the at least two subscribers being present in the email address database.

10. The method according to claim 8, further comprising receiving Internet Protocol (IP) addresses of the at least two subscribers, and determining as part of the risk check whether or not the IP addresses are present in an IP address database, and classifying the second of the at least two subscribers into the double opt-in group based on the IP address of the second of the at least two subscribers being present in the IP address database.

11. The method according to claim 8, wherein the risk check comprises a screening of the email addresses of the at least two subscribers for predetermined patterns or strings, and classifying the second of the at least two subscribers into the double opt-in group based on the screening of the email addresses.

12. The method according to claim 8, further comprising sending, by the computing device, the confirmation email to the first subscriber in the single opt-in group.

13. The method according to claim 12, wherein the confirmation email sent to the first subscriber in the single opt-in group further includes a button or link to decline an email subscription, and in response to receiving an indication that the first subscriber has selected the decline button or link, avoiding sending the content email to the first subscriber in the single opt-in group.

14. The method according to claim 8, wherein the content email sent to the first subscriber in the single opt-in group includes a confirmation button or link, and in response to receiving an indication that the first subscriber has selected the confirmation button or link, removing the confirmation button or link from a subsequent content email send to the first subscriber in the single opt-in group.

15. A computer program product comprising a non-transitory computer readable storage medium having program instructions embodied therewith, the program instructions executable by a computing device to cause the computing device to:
receive a first email address of a first subscriber and a second email address of a second subscriber;
determine a location of the first subscriber and a location of the second subscriber;
classify the first subscriber into a first group based on the location of the first subscriber and the second subscriber into a second group based on the location of the second subscriber;
send a confirmation email including a confirmation button or link to the first email address of the first subscriber in the first group; and send a content email to the second email address of the second subscriber in the second group, and avoid sending the content email to the first email address of the first subscriber in the first group until receiving an indication that the first subscriber has selected the confirmation button or link, wherein the first group is a double opt-in group and the second group is a single opt-in group.

16. The computer program product according to claim 15, wherein the location of the first subscriber is determined based on an Internet Protocol (IP) address of the first subscriber and the location of the second subscriber is determined based on an IP address of the second subscriber.

17. The computer program product according to claim 15, wherein the location of the first subscriber and the location of the second subscriber are determined using a Global Positioning System.

18. The computer program product according to claim 15, wherein the location of the first subscriber and the location of the second subscriber is determined using a wireless network connection.

19. The computer program product according to claim 15, the program instructions further being executable by the computing device to cause the computing device to send the confirmation email to the second email address of the second subscriber in the second group.

\* \* \* \* \*